July 30, 1957     W. F. O'GORMAN     2,801,063
AIRPLANE-KITE

Filed March 10, 1955     2 Sheets-Sheet 1

INVENTOR
WILLIAM FRANCIS O'GORMAN
By James and Franklin
ATTORNEYS.

July 30, 1957 W. F. O'GORMAN 2,801,063
AIRPLANE-KITE
Filed March 10, 1955 2 Sheets-Sheet 2
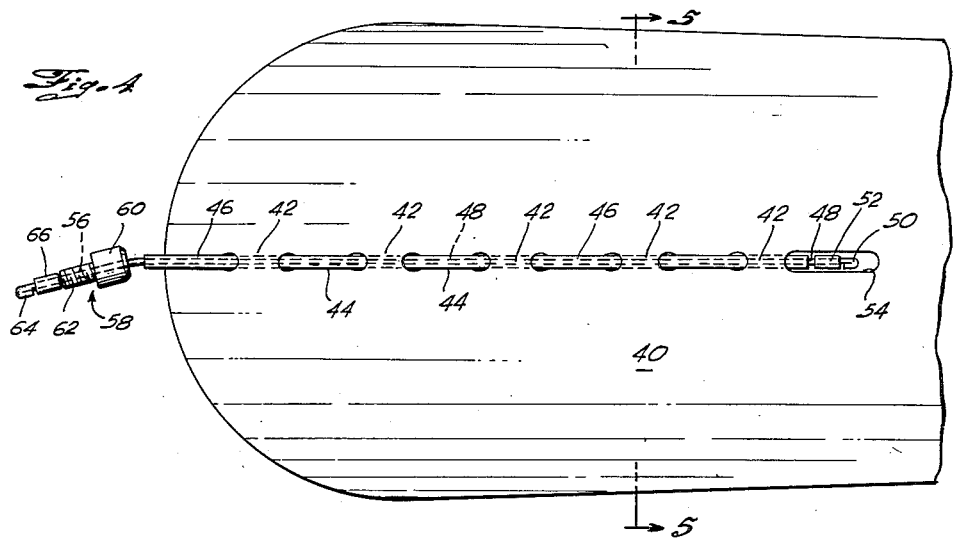
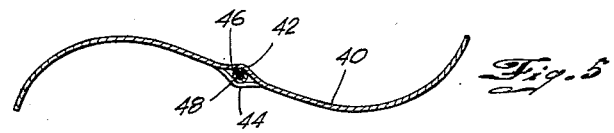
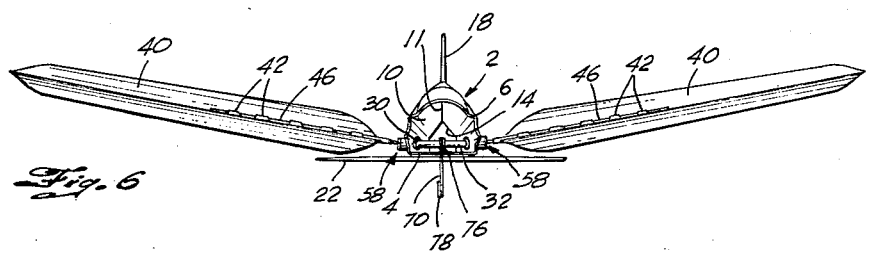
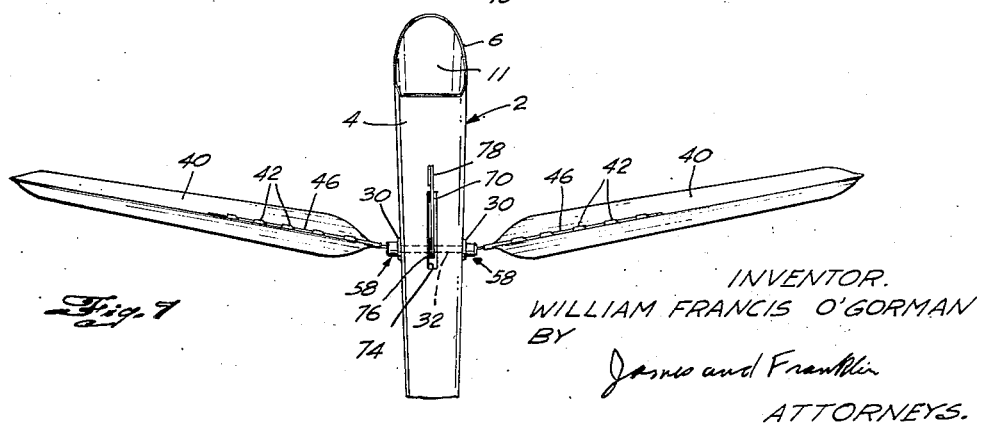
INVENTOR.
WILLIAM FRANCIS O'GORMAN
BY
James and Franklin
ATTORNEYS.

United States Patent Office 2,801,063
Patented July 30, 1957

2,801,063

AIRPLANE-KITE

William Francis O'Gorman, New York, N. Y., assignor to Radio City Toy Company, Inc., New York, N. Y., a corporation of New York Application March 10, 1955, Serial No. 493,526

16 Claims. (Cl. 244—154)

The present invention relates to a kite which simulates an airplane in appearance and the lift of which is derived from wings adapted to rotate about an axis substantially parallel to the length of such wings.

That a lifting force may be derived from S-shaped wings which rotate about axes substantially parallel to their length has long been known, and it has been proposed in the past to mount those S-shaped wings on a body simulating the fuselage of an airplane, and to have the elements rotated solely by the force of a wind, the device thus functioning as a kite. Calhoun Patent 2,593,979 of April 22, 1952, entitled "Tethered Toy Airplane," illustrates one such construction.

Much of the appeal which kite flying has to individuals of all ages is the ability of the person handling the kite to cause the kite to perform evolutions of different types while it is airborne. The more closely those evolutions can simulate the evolutions actually performed by aircraft the greater is the pleasure derived from the kite. That pleasure is greatly enhanced when the kite simulates an aircraft in appearance as well as in action.

The advent of jet-propelled aircraft has introduced into flying many novel evolutions, one of the most striking of which is the ability of such aircraft to climb straight up— in effect, to stand on its tail and rise. More recently a jet-propelled aircraft has been developed which takes off and lands straight up and down with the fuselage vertical, the fuselage then pivoting to horizontal position for normal flight.

The airplane-kite of the present invention is designed to closely simulate a jet airplane in appearance and to be capable of simulating evolutions characteristic of jet aircraft as well as of conventional aircraft, including the aforementioned ability to take off and climb straight up with the fuselage vertical. In addition, the action of the kite of the present invention when the fuselage is horizontal or substantially so, thus simulating a normal flight attitude, is superior to that of prior constructions. Greater lift is obtained, the attitude of the fuselage of the kite may be controlled and varied almost at will, and the flight of the kite is less susceptible of derangement because of variations or irregularities in the air currents at the heights to which the kite soars.

The fuselage of the airplane-kite of the present invention is hollow and is open at the nose and tail, an air passage being defined through the fuselage, that passage preferably tapering toward the tail. The nose of the fuselage has an airfoil characteristic. Consequently when the fuselage is horizontal or substantially so air will flow through the fuselage and will impart a lift to the kite over and above the primary lift which is derived from the rotating wings. Hence the kite of the present invention is capable of flying higher than previous similar constructions, and of flying in weaker winds than has previously been thought possible. In addition, the passage of air through the fuselage, when the fuselage is comparatively firmly tethered, will tend to cause the fuselage to retain a normal horizontal attitude. The hollow tapered fuselage construction also serves to realistically simulate the appearance of a jet aircraft, even to the large intake at the front and the restricted exhaust port at the rear.

The wings are mounted on the fuselage in such a way that the axes about which the wings rotate, which axes are substantially parallel to the length of the wings, are not fixed with respect to the fuselage, but instead are freely angularly movable relative to the fuselage. Hence the wings can maintain their proper lift-producing relationship to the wind, preferably with an appropriate dihedral angle, entirely independently of the attitude of the fuselage itself. As a result the S-shaped elements defining the wings can rotate and lift the kite whether the fuselage is vertical or horizontal. The kite can therefore climb with the fuselage vertical, thus simulating the climb of a jet plane, and it can also climb or remain at the same altitude with the fuselage horizontal, thus simulating more conventional aircraft maneuvers. In addition, because the axes about which the wings rotate may shift relative to the fuselage, the soaring action of the kite is much less susceptible to changes in direction, and particularly vertical direction, of the wind in which the kite is flying. The attitude of the fuselage, whether horizontal or vertical, may be controlled to large degree by the person who is flying the kite. Providing slack to the kite causes the fuselage to point upwardly and tautening the line to which the kite is secured causes the fuselage to assume a horizontal position.

The structure by means of which these valuable characteristics are obtained is simple and inexpensive. Moreover, the wings may be readily assembled to and disassembled from the fuselage, thus facilitating storage and transportation of the kite when it is not in use without danger of damage to the wings.

To the accomplishment of the above, and to such other objects as may hereinafter appear, the present invention relates to the structure of an airplane-kite as defined in the appended claims and as described in this specification, taken together with the accompanying drawings, in which:

Fig. 4 is a fragmentary top plan view of a wing and the mounting therefor;

Fig. 5 is a cross sectional view taken along the line 5—5 of Fig. 4;

Fig. 6 is a front elevational view of the kite with the fuselage in a horizontal attitude; and Fig. 7 is a view similar to Fig. 6 but with the fuselage in a vertical attitude.

Figure 1:
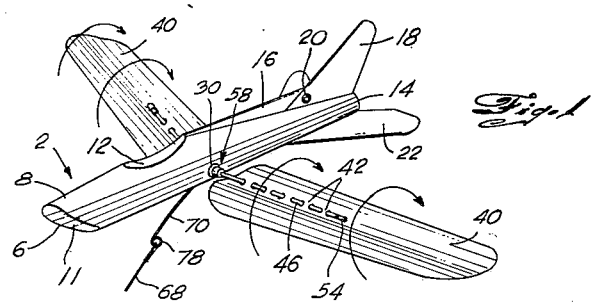
Fig. 1 is a three-quarter perspective view of one embodiment of the present invention.

In order that the kite should be as light as possible consistent with adequate strength and rigidity, the various body parts thereof are formed of thin shaped sheets of material capable of holding their shape, such as certain types of synthetic plastic material or impregnated paper, which sheets are preferably suitably ornamented or provided with an external coating of coloring matter so as to simulate an airplane as closely as possible.

The fuselage, generally designated 2, comprises a tube of such material the sheet ends 4 of which overlap one another at the bottom of the fuselage and are there secured together, as by the use of an appropriate adhesive. The front edge 6 of the fuselage, which defines the nose of the plane, extends forwardly at the top farther than at the bottom, and the top 8 of the fuselage at that area is arched or curved so as to be convex when viewed from the top of the fuselage and concave when viewed from the underside thereof. The interior 10 of the fuselage is hollow and the nose portion thereof is open, as at 11, and communicates directly therewith. Toward the rear of the fuselage, directly behind an opening 12 in the top thereof which simulates a cockpit, the hollow interior of the fuselage tapers rearwardly at 10' and terminates in an opening 14 at the tail of the plane. The sheet material of which the fuselage is formed is, along the top of the tapered portion 10', folded to define a two-ply ridge 16 the depth of which increases as the tail of the plane is approached, and a vertical stabilizer 18, preferably formed of the same sheet material folded on itself to define a two-ply structure, is secured to the ridge 16, as by an appropriate adhesive and by the eyelet 20.

A horizontal stabilizer 22, formed of similar material, is secured to the underside of the rear portion of the fuselage 2 by appropriate adhesive or by the eyelet 24 or both, and to assist in such fastening the forward edge thereof may be provided with a flap 26 which passes through a slot 27 in the bottom of the fuselage and is folded over and adhesively secured to the upper surface of the bottom wall of the fuselage.

From the above description it will be apparent that the hollow interior 10, 10' of the fuselage, together with the nose opening 11 and the tail opening 14, define an air passage through the fuselage through which air will flow while the kite is in flight. The forwardly projecting nose portion 8 of the fuselage defines an airfoil which will impart lift to the fuselage and particularly to the forward part thereof, and the constricted nature of the rear portion 10' of the passage through the fuselage, together with the configuration of the inner walls of the fuselage thereat, will produce a reaction to the flow of air therethrough which will tend to cause the fuselage to orient itself substantially parallel to the direction of air flow and maintain that orientation.

At an appropriate point along the length of the fuselage, and preferably somewhat to the rear of its longitudinal midpoint, the side walls of the fuselage are provided with a pair of registering apertures 28 in which metal grommets 30 are mounted. A hollow tube 32 extends through the grommets 30, the flanges 34 at the ends of that tube preventing it from escaping from the fuselage. The tube 32 is open at its ends 36 and is internally threaded at 38 adjacent those ends.

Figure 2:
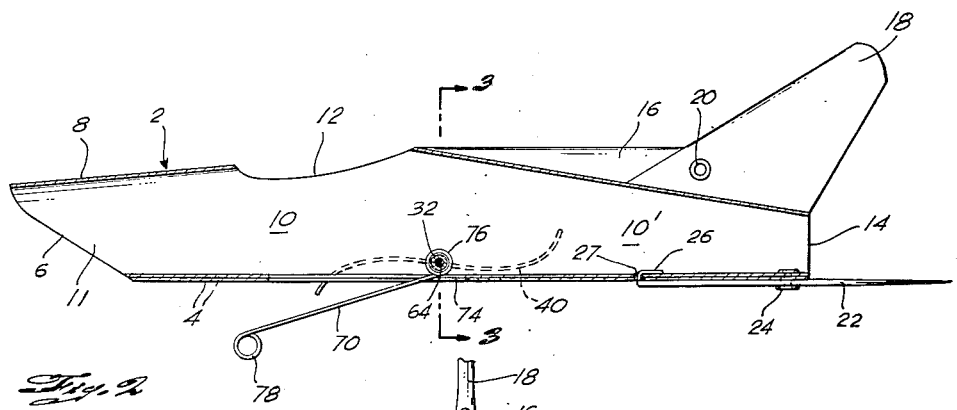
Fig. 2 is a side cross sectional view thereof.
Figure 3:
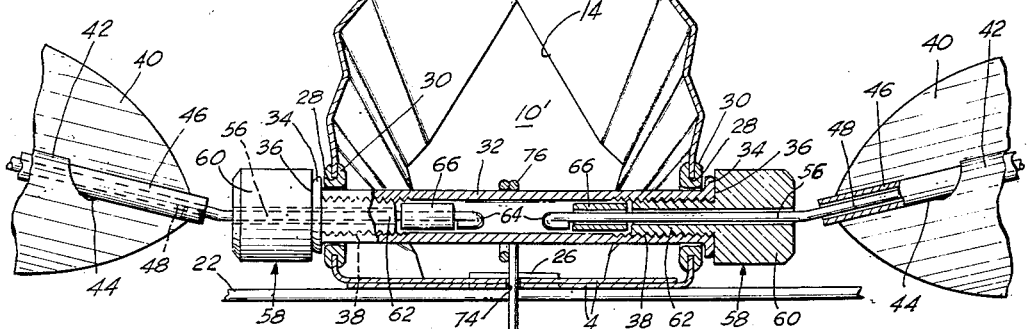
Fig. 3 is a cross sectional view taken along the line 3—3 of Fig. 2.

Each of the wings 40 is substantially S-shaped in cross section, as may best be seen from Figs. 2 and 5. They are provided with a row of aligned alternate protrusions 42 and depressions 44 substantially parallel to the length of the wing 40, and a tube 46 is snugly frictionally received therein. Passing through the tube 46 is a rod 48, the former being freely rotatable over the latter. The outwardly extending end of the rod 48 is reversely bent at 50 (see Fig. 4) and a bushing 52 is received between the rod portion 50 and the end of the tube 46. The wing 40 is recessed at 54 to receive the elements 50 and 52 and the outer end of the tube 46. The wing 40 is therefore seen to be rotatably mounted on the rod 48, that rod defining the axis about which the wing can rotate.

That part 56 of the rod 48 which extends beyond the inner end of the wing 40 is preferably bent at an angle with respect to the body of the rod 48. Received on the rod part 56 and freely rotatable with respect thereto is an element generally designated 58 having an enlarged head 60 and an externally threaded portion 62 of smaller diameter, the portion 62 being adapted to be received within the tube 32 on the fuselage 2 via an open end 36 thereof and to threadedly engage the internally threaded portion 38 thereof, the enlarged head 60 being larger than the interior of the tube 32. The tip of the rod part 56 extends out beyond the portion 62 of the element 58 and is reversely bent at 64, a bushing 66 being freely rotatably received on the rod part 56 between the tip 64 and the element 58.

Thus not only is the wing 40 freely rotatably mounted on the rod 48 and prevented from escaping therefrom because of the bent-over rod portion 50, but also the rod part 56 is rotatably mounted in the element 58 and is prevented from escaping therefrom by reason of the bent-over rod tip 64. The bushings 52 and 66 function as end thrust bearings.

To mount the wings 40 on the fuselage 2 the individual elements 58 are screwed into opposite open ends 36 of the tube 32. The wings 40 may be detached whenever desired simply by unscrewing the elements 58 from the tube 32.

The kite is adapted to be connected to the line 68 to which it is tethered when in flight by means of an element 70 formed of wire or the like which passes through a slot 74 in the bottom wall of the fuselage 2, the upper end 76 of the element 70 is secured to the tube 32 as by being wrapped therearound, and the lower end of the element 70 is provided with an eye 78 to which the line 68 may be tied.

In accordance with principles which are well understood in the art, the lift of the kite is derived from the wind-driven rotation of the S-shaped wings 40 about their axes of rotation defined by the rods 48. Under normal conditions the wings 40 should assume a slight dihedral angle, as shown in Figs. 6 and 7, in order to produce optimum lift and stability. Because of the manner in which the wings 40 are mounted on the fuselage 2, they can assume that optimum position relative to the direction of wind flow entirely independently of the attitude of the fuselage 2. Figs. 6 and 7 illustrate two extreme relative positions of the fuselage 2 with respect to the wings 40, it being assumed that the wind is blowing in a direction into and perpendicular to the plane of the drawings. In Fig. 6 the fuselage 2 is parallel to the direction of wind flow, whereas in Fig. 7 the fuselage 2 is perpendicular thereto. It is significant that despite the wide variation in attitude of the fuselage 2, the wings 40 nevertheless maintain their optimum attitude relative to wind flow, and thus generate lift and provide stability in a most efficient manner.

In general the fuselage 2 will assume its horizontal position shown in Fig. 6 when a strong pull is exerted by the line 68 on the kite via the element 70. When the line 60 is slackened, however, as when line is being played out, the fuselage will tend to assume its vertical position shown in Fig. 7.

Thus the kite may be started standing on its tail. The action of the wind on the wings will cause them to assume their position shown in Fig. 7, and the kite will start to rise. If the line 68 is played out at a proper rate, the kite can be caused to rise to an appreciable height while th fuselage 2 remains vertical, the wings 40 rotating about the rods 48 to provide the desired lift. After the kite has reached its desired altitude, a tautening of the line 68 will cause the fuselage to assume its horizontal position shown in Fig. 6, at which time certain additional lift will be provided to the kite by reason of the airfoil characteristics of the fuselage 2 itself. Moreover, the aerodynamic characteristics of the air passage 10, 10' through the fuselage 2 will tend to cause the fuselage 2 to remain in its horizontal attitude. Slackening of the line 68 will not only permit the kite to climb, but will also tend to cause th fuselage 2 to nose up, while pulling in on the line 68 will cause the kite to perform other gyrations.

On occasion the wind in which the kite is flown may be quite gusty, and this sometimes results in departures of the wind direction from the horizontal, particularly when the kite is being flown over hilly or densely populated land areas. The fact that the axes of rotation of the wings 40 may freely shift angularly relative to the fuselage 2 makes the kite of the present invention much more stable in such situations than previously known constructions.

While but a single embodiment of the present invention has been here disclosed, it will be apparent that many variations may be made in the details thereof without departing from the spirit of the invention as defined in the following claims.

I claim:

1. In an airplane-kite comprising a fuselage and wings extending laterally therefrom and adapted to rotate about an axis substantially parallel to their length; the improvement which comprises said wings being mounted on said fuselage so that the axes about which said wings rotate are free to move between two different angular orientations relative to said fuselage.

2. In an airplane-kite comprising a fuselage and wings extending laterally therefrom and adapted to rotate about an axis substantially parallel to their length; the improvement which comprises each of said wings being rotatably mounted on a rod which defines the axis about which said wing rotates, said rod having a part extending beyond said wing and angularly related to that portion of the rod on which said wing is mounted, said rod part being mounted on said fuselage so as to be freely rotatable substantially about its own length over an appreciable angular extent.

3. In an airplane-kite comprising a fuselage and wings extending laterally therefrom and adapted to rotate about an axis substantially parallel to their length; the improvement which comprises each of said wings being rotatably mounted on a rod which defines the axis about which said wing rotates, said rod having a part extending beyond said wing and angularly related to that portion of the rod on which said wing is mounted, an open-ended tube passing laterally through said fuselage, said rod part being received within said tube via an open end thereof so as to be freely rotatable substantially about its own length over an appreciable angular extent, and means retaining said rod part in said tube.

4. The airplane-kite of claim 3, in which said tube is internally threaded, and in which said rod part is freely rotatably received within a hollow externally threaded element which fits within and threadedly engages the interior of said tube.

5. In an airplane-kite comprising a fuselage and wings extending laterally therefrom and adapted to rotate about an axis substantially parallel to their length; the improvement which comprises each of said wings being rotatably mounted on an individual rod defining the axis about which said wing rotates, each rod having a part extending beyond said wing and angularly related to that portion of the rod on which said wing is mounted, the rod part operatively associated respectively with each of said wings being mounted at opposite sides of said fuselage so as to be each independently freely rotatable substantially about its own length over an appreciable angular extent.

6. In an airplane-kite comprising a fuselage and wings extending laterally therefrom and adapted to rotate about an axis substantially parallel to their length; the improvement which comprises each of said wings being rotatably mounted on an individual rod defining the axis about which said wing rotates, each rod having a part extending beyond said wing and angularly related to that portion of the rod on which said wing is mounted, a tube passing laterally through said fuselage and being open at both ends, the rod parts operatively associated respectively with each of said wings being received within said tube via opposite open ends thereof respectively so as to be freely independently rotatable substantially about their own length over an appreciable angular extent.

7. The airplane-kite of claim 6, in which said tube is internally threaded, and in which each of said rod parts is freely rotatably received within a hollow externally threaded element, the element operatively associated respectively with each of said rod parts fitting within and threadedly engaging with the interior of said tube at opposite ends thereof.

8. In an airplane-kite comprising a fuselage anl wings extending laterally therefrom and adapted to rotate about an axis substantially parallel to their length; the improvement which comprises said fuselage being hollow and open at nose and tail, thereby defining an air passage therethrough, said wings being mounted on said fuselage so that the axes about which said wings rotate are free to move between two different angular orientations relative to said fuselage.

9. In an airplane-kite comprising a fuselage and wings extending laterally therefrom and adapted to rotate about an axis substantially parallel to their length; the improvement which comprises said fuselage being hollow and open at nose and tail, thereby defining an air passage therethrough, each of said wings being rotatably mounted on a rod which defines the axis about which said wing rotates, said rod having a part extending beyond said wing and angularly related to that portion of the rod on which said wing is mounted, said rod part being mounted on said fuselage so as to be freely rotatable substantially about its own length over an appreciable angular extent.

10. In an airplane-kite comprising a fuselage and wings extending laterally therefrom and adapted to rotate about an axis substantially parallel to their length; the improvement which comprises said fuselage being hollow and open at nose and tail, thereby defining an air passage therethrough, each of said wings being rotatably mounted on a rod which defines the axis about which said wing rotates, said rod having a part extending beyond said wing and angularly related to that portion of the rod on which said wing is mounted, an open-ended tube passing laterally through said fuselage, said rod part being received within said tube via an open end thereof so as to be freely rotatable substantially about its own length over an appreciable angular extent, and means retaining said rod part in said tube.

11. In an airplane-kite comprising a fuselage and wings extending laterally therefrom and adapted to rotate about an axis substantially parallel to their length; the improvement which comprises said fuselage being hollow and open at nose and tail, thereby defining an air passage therethrough, the nose of said fuselage comprising a wall curved to have a downward concavity, the front edge of said wall being inclined rearwardly and downwardly, the space within said wall concavity communicating with said air passage, said wings being mounted on said fuselage so that the axes about which said wings rotate are free to move between two different angular orientations relative to said fuselage.

12. In an airplane-kite comprising a fuselage and wings extending laterally therefrom and adapted to rotate about an axis substantially parallel to their length; the improvement which comprises said fuselage being hollow and open at nose and tail, thereby defining an air passage therethrough, the nose of said fuselage comprising a wall curved to have a downward concavity, the front edge of said wall being inclined rearwardly and downwardly, the space within said wall concavity communicating with said air passage, each of said wings being rotatably mounted on a rod which defines the axis about which said wing rotates, said rod having a part extending beyond said wing and angularly related to that portion of the rod on which said wing is mounted, said rod part being mounted on said fuselage so as to be freely rotatable substantially about its own length over an appreciable angular extent.

13. In an airplane-kite comprising a fuselage and wings extending laterally therefrom and adapted to rotate about an axis substantially parallel to their length; the improvement which comprises said fuselage being hollow and open at nose and tail, thereby defining an air passage therethrough, the nose of said fuselage comprising a wall curved to have a downward concavity, the front edge of said wall being inclined rearwardly and downwardly, the space within said wall concavity communicating with said air passage, each of said wings being rotatably mounted on a rod which defines the axis about which said wing rotates, said rod having a part extending beyond said wing and angularly related to that portion of the rod on which said wing is mounted, an open-ended tube passing laterally through said fuselage, said rod part being received within said tube via an open end thereof so as to be freely rotatable substantially about its own length over an appreciable angular extent, and means retaining said rod part in said tube.

14. In an airplane-kite comprising a fuselage and wings extending laterally therefrom and adapted to rotate about an axis substantially parallel to their length; the improvement which comprises said fuselage being hollow and open at nose and tail, thereby defining an air passage therethrough, the nose opening being larger than the tail opening and a portion of said passage being generally tapered toward said tail, the nose of said fuselage comprising a wall curved to have a downward concavity, the front edge of said wall being inclined rearwardly and downwardly, the space within said wall concavity communicating with said air passage, said wings being mounted on said fuselage so that the axes about which said wings rotate are free to move between two different angular orientations relative to said fuselage.

15. In an airplane-kite comprising a fuselage and wings extending laterally therefrom and adapted to rotate about an axis substantially parallel to their length; the improvement which comprises said fuselage being hollow and open at nose and tail, thereby defining an air passage therethrough, the nose opening being larger than the tail opening and a portion of said passage being generally tapered toward said tail, the nose of said fuselage comprising a wall curved to have a downward concavity, the front edge of said wall being inclined rearwardly and downwardly, the space within said wall concavity communicating with said air passage, each of said wings being rotatably mounted on a rod which defines the axis about which said wing rotates, said rod having a part extending beyond said wing and angularly related to that portion of the rod on which said wing is mounted, said rod part being mounted on said fuselage so as to be freely rotatable substantially about its own length over an appreciable angular extent.

16. In an airplane-kite comprising a fuselage and wings extending laterally therefrom and adapted to rotate about an axis substantially parallel to their length; the improvement which comprises said fuselage being hollow and open at nose and tail, thereby defining an air passage therethrough, the nose opening being larger than the tail opening and a portion of said passage being generally tapered toward said tail, the nose of said fuselage comprising a wall curved to have a downward concavity, the front edge of said wall being inclined rearwardly and downwardly, the space within said wall concavity communicating with said air passage, each of said wings being rotatably mounted on a rod which defines the axis about which said wing rotates, said rod having a part extending beyond said wing and angularly related to that portion of the rod on which said wing is mounted, an open-ended tube passing laterally through said fuselage, said rod part being received within said tube via an open end thereof so as to be freely rotatable substantially about its own length over an appreciable angular extent, and means retaining said rod part in said tube.

References Cited in the file of this patent

UNITED STATES PATENTS

| | | |
|---|---|---|
| D. 168,383 | Smith | Dec. 9, 1952 |
| 987,596 | Parisana | Mar. 21, 1911 |
| 2,548,748 | Stephan | Apr. 10, 1951 |
| 2,681,775 | Orazi | June 22, 1954 |